United States Patent [19]
Frager et al.

[11] Patent Number: 6,018,652
[45] Date of Patent: *Jan. 25, 2000

[54] CELLULAR TELEPHONE SYSTEM HAVING MOBILE CHARGING REGION AND AREA BASED PRICING METHOD AND APPARATUS

[75] Inventors: Hervé Frager, Montreal; Berislav Hodko, Beaconsfield; David Bell, Montreal, all of Canada

[73] Assignee: Telefonaktiebolaget LM Ericsson (publ.), Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/522,182

[22] Filed: Aug. 31, 1995

[51] Int. Cl.[7] .................................................. H04Q 7/20
[52] U.S. Cl. ........................................ 455/406; 455/408
[58] Field of Search ............................. 379/60, 111, 114, 379/122, 123, 213, 59, 58; 455/406, 432, 433, 445, 456, 457

[56] References Cited

U.S. PATENT DOCUMENTS

| | | | |
|---|---|---|---|
| 4,640,986 | 2/1987 | Yotsutani et al. | 379/60 |
| 4,782,508 | 11/1988 | Borchering et al. | 379/213 |
| 5,295,180 | 3/1994 | Vendetti et al. | 455/456 |
| 5,303,297 | 4/1994 | Hillis | 455/406 |
| 5,327,144 | 7/1994 | Stilp et al. | 379/58 |
| 5,361,297 | 11/1994 | Ortiz et al. | 379/130 |
| 5,444,765 | 8/1995 | Marui et al. | 455/432 |
| 5,473,671 | 12/1995 | Partridge, III | 455/445 |
| 5,488,655 | 1/1996 | Hamlen | 379/114 |
| 5,568,153 | 10/1996 | Beliveau | 342/357.1 |
| 5,577,100 | 11/1996 | McGregor et al. | 455/406 |
| 5,600,706 | 2/1997 | Dunn et al. | 455/456 |
| 5,787,354 | 7/1998 | Gray et al. | 455/456 |

FOREIGN PATENT DOCUMENTS

| | | |
|---|---|---|
| 0597638 | 5/1993 | European Pat. Off. . |
| 0568824 | 7/1993 | European Pat. Off. . |
| WO9428670 | 8/1994 | WIPO . |
| WO96/20570 | 4/1996 | WIPO . |
| WO 97/13387 | 4/1997 | WIPO . |

*Primary Examiner*—Dwayne D. Bost
*Assistant Examiner*—Myron K. Wyche
*Attorney, Agent, or Firm*—Jenkens & Gilchrist

[57] ABSTRACT

A number of charging regions and associated special charging rates are defined for a cellular telephone subscribers. The available charging regions are selectively assembled by subscribers to define charging areas within which that subscriber is entitled to special rates for cellular calls. When a subscriber is engaged in a cellular call and is located with the subscriber's charging area, the subscriber is charged the special charging rate granted to the charging region within which the subscriber is located. Otherwise, the subscriber is charged at conventional cellular charging rates. In instances where the subscriber is not given the special rate, or otherwise is to be charged at more than the lowest available rate, the system notifies the participating subscriber that the call is not subject to the special rate and gives the subscriber an opportunity to terminate without being charged.

27 Claims, 4 Drawing Sheets

CELLULAR TELEPHONE SYSTEM HAVING MOBILE CHARGING REGION AND AREA BASED PRICING METHOD AND APPARATUS

BACKGROUND OF THE INVENTION

1. Technical Field of the Invention

The present invention relates to cellular telephone systems and, in particular, to a method and apparatus for pricing cellular telephone calls based on subscriber location.

2. Description of Related Art

Conventional wire-line telephone service providers price telephone calls by taking into account a number of pricing structure parameters including call duration, call distance, time of day and day of the week. The generally fixed nature of the physical plant used to provide telephone service, coupled with the fact that calls are made from one known fixed geographic location to another, allows for the charges associated with providing the telephone service to be easily calculated and published.

The nature of the cellular telephone network, however, wherein system users have little or no geographical restrictions on the locations from which they may place or receive calls, makes the calculation of call charges more difficult. Rates vary based not only on some or all of the wire-line parameters mentioned above, but also on factors such as: which of several available cellular service providers carry the call; and whether the subscriber is roaming outside its own service area. Because the subscriber is generally unaware of how the foregoing factors affect the instantaneous rate calculation for each call, it is unlikely that the subscriber can make anything more than a best guess as to the charge incurred for the call.

There is a need for a method and system for providing cellular telephone subscribers with a cellular service wherein reduced rates are offered for calls originated from or terminated in certain predefined regions or areas of the cellular service area. Such a service should further provide cellular telephone subscribers with information prior to completion of a call connection concerning the charges to be incurred for placing or receiving a cellular telephone call.

SUMMARY OF THE INVENTION

In accordance with one embodiment of the invention, certain cellular cells are grouped together to form a charging region within which special calling rates are available to participating subscribers for cellular calls. The cellular coverage area may contain plural adjacent, overlapping or contiguous charging regions. Preferably, the charging regions and the special calling rates applicable thereto are defined by the cellular provider.

The cellular communications system processes subscriber calls to determine whether the subscriber is located within one of the defined charging regions. If the subscriber participates in the benefits of this calling service but is not located within one of the defined charging regions, the system notifies the subscriber and gives the subscriber the option to choose to terminate and/or reject the call without incurring any fee or charge for the call. Calls made from or received in a defined charging region by the participating subscriber, on the other hand, are charged at the special cellular charging rate for that charging region.

In a second embodiment of the present invention, the cells are again grouped together as in the first embodiment to form a plurality of charging regions within which special calling rates are available for cellular calls. In addition, certain ones of the charging regions are then grouped together to form one or more charging areas. Preferably, the charging regions and the special calling rates applicable thereto are defined by the cellular provider, while the grouping of the regions into charging areas is made by individual participating cellular subscribers in accordance with their common locations and calling habits.

The cellular communications system processes subscriber calls to determine whether the participating subscriber is located within its defined charging area. Calls made from or received in the defined charging area by the participating subscriber are then charged at the special rate assigned to the charging region (of that subscriber's charging area) within which the subscriber is currently located. If, on the other hand, the participating subscriber is not located within its defined charging area, or is otherwise not receiving the lowest charging rate available, the system notifies the subscriber and gives the subscriber the option to choose to terminate and/or reject the call without incurring any fee or charge for the call.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF EMBODIMENTS

Figure 1A:
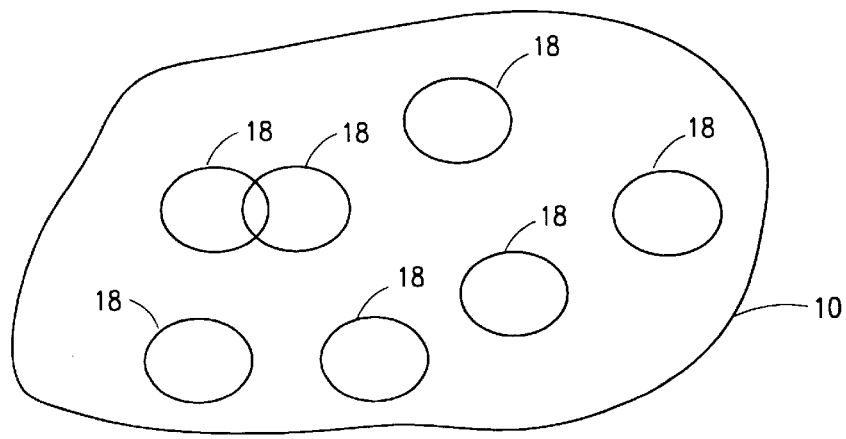
FIG. 1A illustrates the subdivision of a portion of a cellular coverage area to include a plurality of charging regions.

Referring now to FIG. 1A, there is shown an arbitrary geographic area 10 wherein cellular telephone service is provided to a plurality of subscribers by at least one, and perhaps many cellular service providers. The cellular service area 10 is subdivided to include a plurality of charging regions 18, wherein one charging region may, but need not necessarily, be adjacent to, overlapping or contiguous with another charging region. Furthermore, some portions of the area 10, although included for purposes of providing cellular communications coverage, may not be included within any of the charging regions 18. The cell and/or coverage area of each charging region 18 with the area 10 is preferably selected by the cellular service provider.

The charging regions 18 facilitate the provision of a special pricing service in accordance with the present invention that entitles subscribers who participate in the service to make and receive cellular telephone calls at a special (i.e., non-standard and perhaps reduced) cellular charging rate provided the calls occur when the subscriber is located within an authorized one of the predefined charging regions 18. In this connection it should be recognized that each charging region 18 has its own special charging rate, and that the subscriber may be authorized to receive the special rate of one of the charging regions 18 while simultaneously not be so authorized within another one of the charging regions within the area 10. Calls occurring when the subscriber is located outside an authorized one of its charging regions 18 are, on the other hand, charged at the conventional (i.e., standard and perhaps higher than the special) cellular charging rates.

Figure 1B:
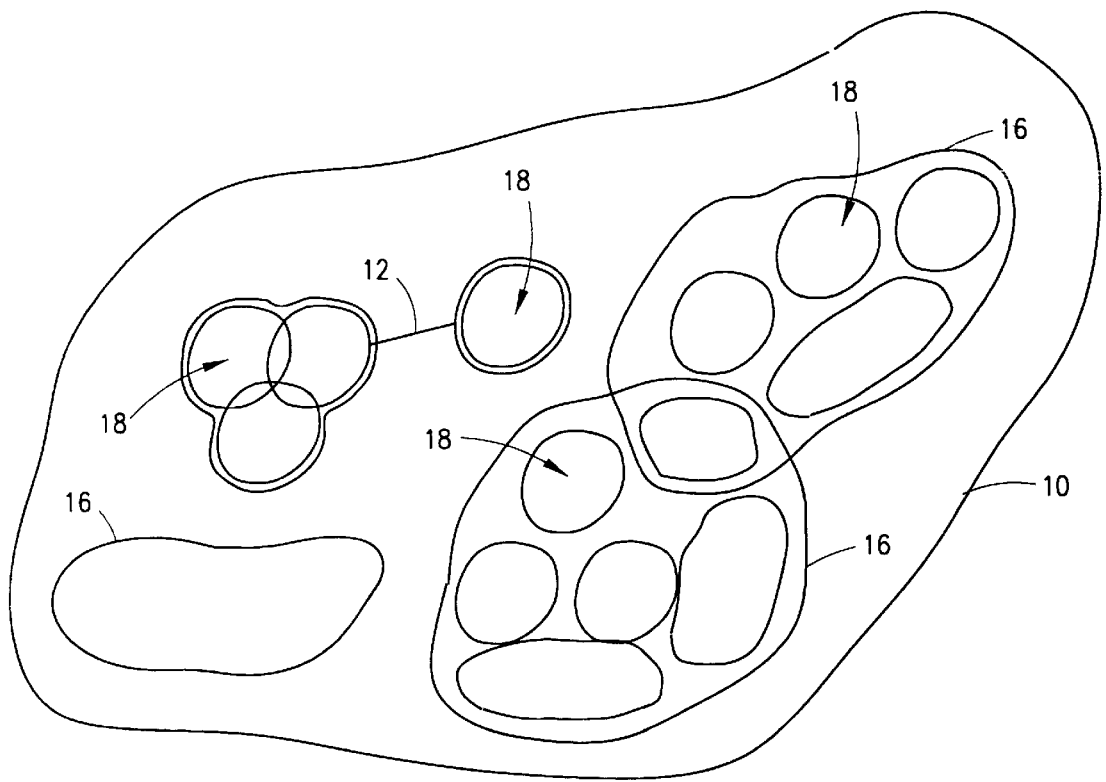
FIG. 1B illustrates the subdivision of a portion of a cellular coverage area to include a plurality of charging areas, wherein each charging area includes at least one charging region.

Reference is now made to FIG. 1B wherein the cellular service area 10 is shown subdivided to include a plurality of predefined charging areas 16, wherein one charging area may be adjacent to, overlapping or contiguous with another charging area. The use of such charging areas 16 provides one method for making the authorization determination referred to with respect to FIG. 1A. To accomplish this goal, each charging area 16 includes at least one of the provider defined charging regions 18. The cell and/or coverage area of, and charging regions 18 within, each charging area 18 within the area 10 is preferably selected by the subscriber to accommodate and complement the subscriber's calling habits.

In accordance with the special pricing service of the present invention, each participating subscriber selects for himself or herself a unique charging area 16 comprised of one or more of the provider defined charging regions 18. It will be understood that the charging regions 18 selected for any given charging area 16 need not necessarily be contiguous, adjacent or overlapping as generally indicated at 12. Furthermore, more than one subscriber may share the same charging area 16. The pricing service entitles participating subscribers to make and receive cellular telephone calls at the special cellular charging rate provided the calls occur when the subscriber is located within one of the charging regions 18 selected by the subscriber for inclusion within its associated predefined charging area 16. The special charging rate in effect for the call is the charging rate for the charging region 18 within which the subscriber is located. Calls occurring when the subscriber is located outside its charging area 16 are, on the other hand, charged at the conventional cellular charging rate.

Figure 2:
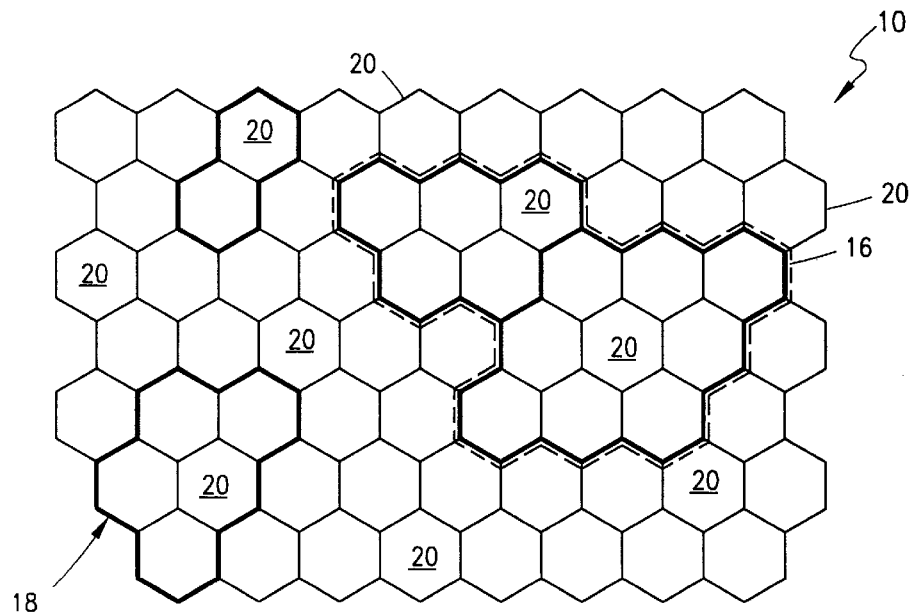
FIG. 2 illustrates the relationship between cells, charging regions and charging areas.

Reference is now made to FIG. 2 wherein a small portion of the cellular coverage area 10 is shown to be comprised of a plurality of cells 20 (represented by hexagrams). An exemplary plurality of charging regions 18 (outlined in bold to ease recognition) are shown in the area 10, and are defined by the service provider to each have a special cellular charging rate. Each charging region 18 includes one or more of the cells 20, and a cell in the area 10 may reside in one, more than one, or none of the charging regions 18. A single charging area 16 (outlined in broken lines to ease recognition) is shown in the area 10 assembled from two of the charging regions 18. Although shown composed of adjacent charging regions 18, the charging regions for any given charging area 16 need not necessarily be adjacent to each other (see, FIG. 1B). It will further be understood that a charging region 18 may belong to more than one charging area 16 with each charging area 16 being defined by and associated with a participating subscriber. It should further be understood that more than one participating subscriber may be assigned or select the same charging area 16.

The cells 20 spread throughout the cellular service area 10 may be serviced by different cellular service providers. However, the charging regions 18 and charging areas 16 may include cells 20 serviced by both service providers. Furthermore, for the portions of the area 10 assigned to a single provider, the charging regions 18 and charging areas 16 may include cells 20 serviced by different mobile switching centers. Thus, in general, it should be recognized that the special pricing services provided in accordance with the present invention is flexible in its implementation, and not restricted to provision by one service provider or by multiple uncooperative providers or within the coverage responsibility of a single mobile switching center. Agreements between providers concerning the extent of charging regions 18 and charging areas 16, and the special rates available to participating subscribers, will facilitate the efficient offering of the service.

Figure 3:
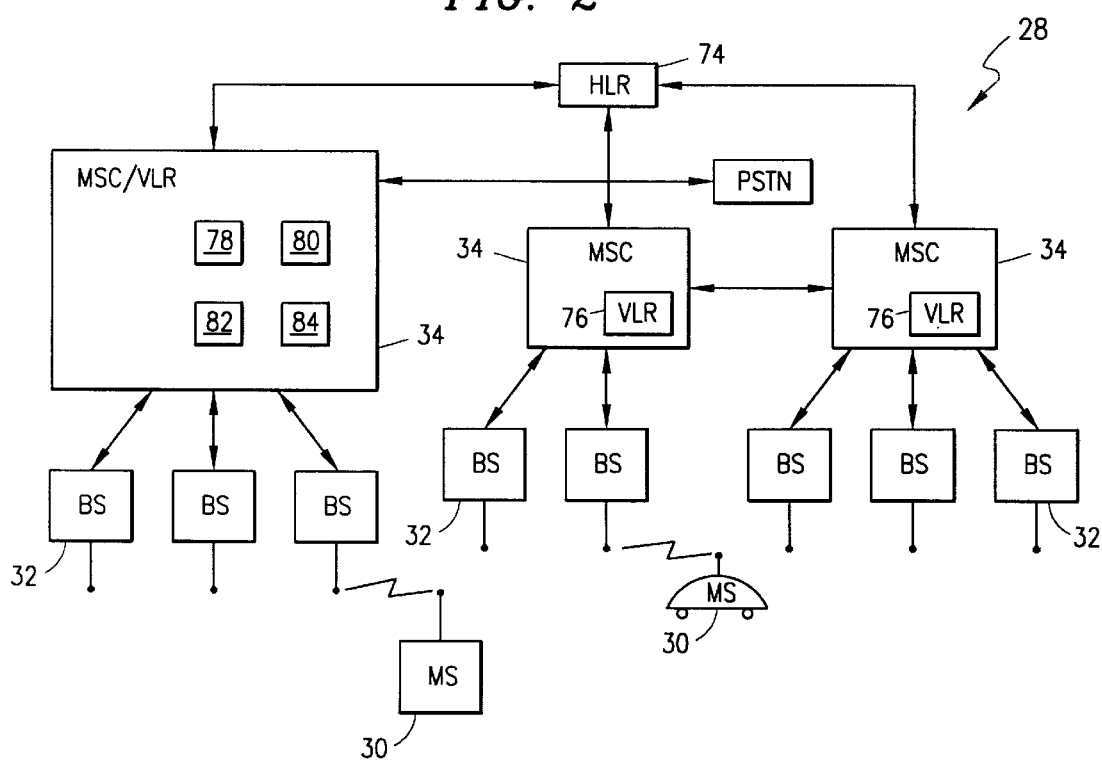
FIG. 3 is a block diagram illustrating the cellular communications system of the present invention.

Referring now to FIG. 3, cellular telephone service is provided within the cellular service area 10 by means of a cellular telephone system 28 comprising mobile stations (MS) 30, base stations (BS) 32, and at least one mobile switching center (MSC) 34. The mobile stations 30 are carried by each subscriber, and communicate with the base stations 32 in a manner well known to those skilled in the art by means of radio frequency communications links. Each base station 32 is located within a cell 20 (FIG. 2), and is connected to its associated mobile switching center 34 preferably through wire-lines or radio frequency links. The mobile switching centers 34 are connected to the public switched telephone network (PSTN) or other known communications network, and function to process and switch through the base stations 32 the cellular calls originated or received by the subscribers using the mobile stations 30. It will, of course, be understood that multiple mobile switching centers 34 may be needed to connect with the base stations 32 covering the area 10, and that the cells 20 in a charging region 18 for one charging area 16 may be served by different mobile switching centers 34. Furthermore, as discussed above, multiple service providers may be involved in offering the service to subscribers. To facilitate implementation of the pricing system of the present invention, however, it is preferred that the cells 20 in any given charging region 18 be served by a single mobile switching center 34 and controlled by a single service provider.

Each of the cells 20 includes at least one base station 32 configured to facilitate communications with proximately located mobile stations 30. Although not shown in the drawings, the base stations 32 are typically positioned at or near the center of each of the cells. However, depending on geography and other known factors, the base stations 32 may instead be located at or near the periphery of, or otherwise away from the centers of, each of the cells. In such instances, the base stations 32 may broadcast and communicate with mobile stations 30 carried by subscribers who are located within the cells using directional rather than omni-directional antennas. Each one of the base stations 32 includes a transmitter, a receiver, and a base station controller connected to the antenna in a manner and with a configuration well known in the art.

The special pricing service implemented by the cellular system 28 in accordance with the present invention advantageously provides participating subscribers with charging rates based on subscriber location. Cellular calls originating from or received by the participating subscriber while located in its defined charging area 16 are charged at a special rate. Calls made by or directed to the subscriber when at other locations (i.e., outside the subscriber's charging area 16) are billed at conventional rates which may be more expensive than the special rates. Subscriber location with respect to the charging area 16 is determined by which base station 32 (i.e., cell 20) is handling subscriber mobile station 30 communications at the time the call is either originated, received or handed-off. The special rate to be charged to the subscriber when located within its predefined charging area 16 is the special rate assigned to the particular charging region 18 (within that charging area) wherein the subscriber is located. Thus, the special rate charged to the participating subscriber may change, even though the subscriber never leaves its charging area 16 if the subscriber moves amongst the included charging regions 18.

Figure 4A:
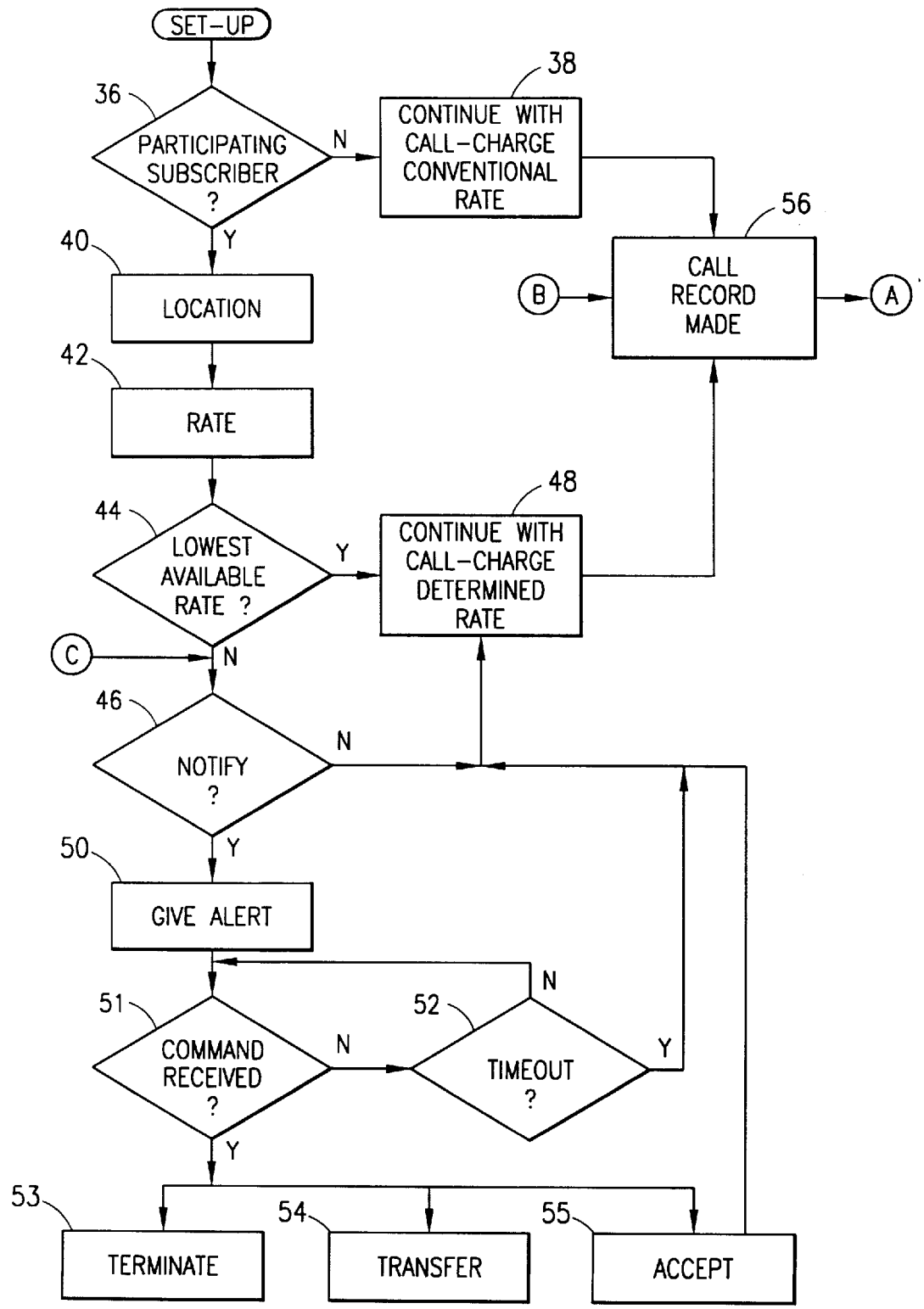
FIGS. 4A–4B are flow diagrams illustrating the system operating method of the present invention.
Figure 4B:
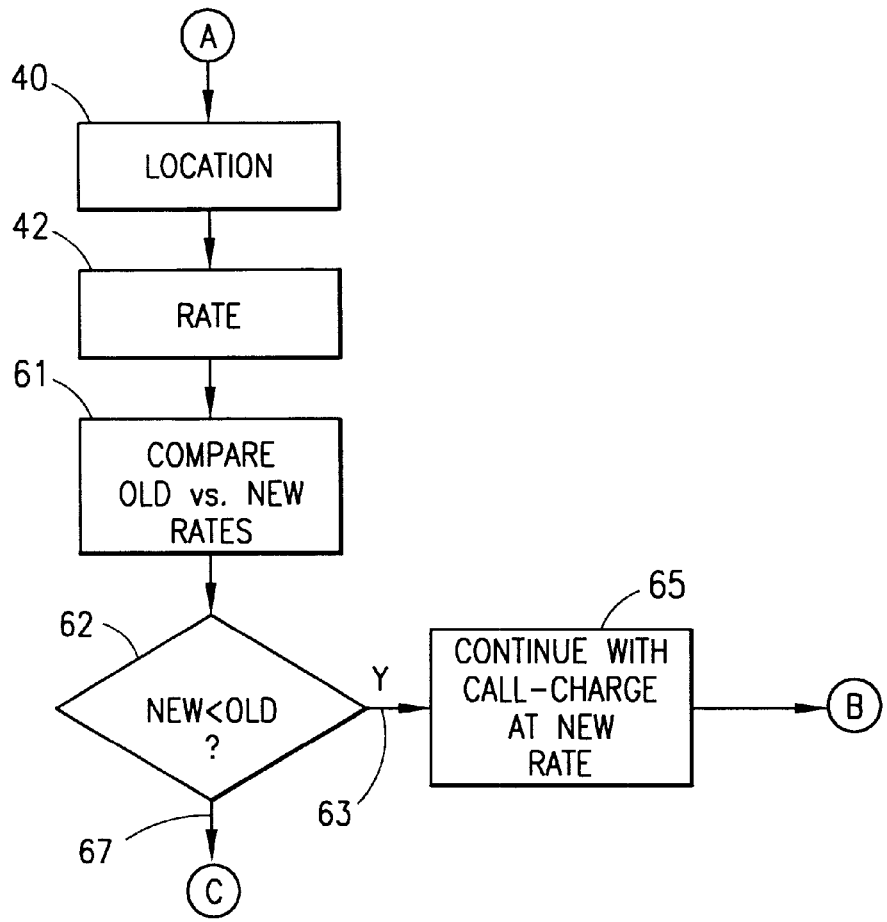

Reference is now made to FIGS. 4A–4B wherein there are shown flow diagrams illustrating the operation of the method of the present invention for providing flexible charging service based on charging areas. As discussed above, to implement the method of the present invention, a plurality of charging regions 18 are defined (preferably by the cellular service provider) to have their own special cellular charging rates. Each charging region 18 includes at least one of the plurality of cells 20 in the cellular service area 10. Next, each participating subscriber selects at least one of the plurality of charging regions 18 to define a charging area 16 for that subscriber. The subscriber defined charging area 16 is stored in the home location register (HLR) 74 of the cellular telephone system 28 (see, FIG. 3) as an associated data to the subscriber.

Referring now in particular to FIG. 4A, there are illustrated the steps performed by the system in processing incoming as well as outgoing calls. At call set-up (i.e., when a call is either first instigated by a subscriber mobile station 30 or first received in the mobile switching center 34 destined for delivery to a subscriber), a determination is made at step 36 as to whether the subscriber is participating in the charging service provided by the system of the present invention. If not, set-up of the call continues in step 38 in normal fashion known to those skilled in the art and the conventional cellular charging rate will apply to the call. If the subscriber is participating, however, the current location of the subscriber is next identified in step 40 (perhaps by identifying which cell base station 32 is being used to communicate with the mobile station 30 of the subscriber). The identified location is then compared with the stored subscriber charging areas in step 42 to determine whether the subscriber is located in that subscriber's predefined charging area 16, and to identify from the charging region 18 the cellular charging rate to be applied to the call. This determination involves first determining which charging regions 18 are associated with the cell 20 then handling the call, followed by a determination of whether any of the determined charging regions 18 belong to the participating subscriber's charging area 16.

If only one charging region is associated with the cell, the special rate corresponding to that charging region is applied to the call (provided that charging region is located within the subscriber's charging area 16). However, for cells belonging to more than one charging region, it is possible that different special cellular charging rates will be implicated. In this case, the lowest (i.e., most reduced) of the special cellular charging rates is preferably applied to the call (again provided that charging region 18 is located within the subscriber's charging area 16). If the subscriber is not located within its predefined charging area, the conventional cellular charging rate is applied to the call.

A verification is then made at step 44 to confirm that the participating subscriber is being charged at the lowest cellular charging rate available to the subscriber. If this test is satisfied, then the participating subscriber is charged at the rate determined in step 42 and the call continues in step 48 in normal fashion known to those skilled in the art, with the subscriber being charged at that determined rate.

If, however, the subscriber is not being charged at the lowest available cellular charging rate (perhaps because the subscriber is located outside its charging area), the subscriber, if it desires, receives an alert notification as to the rate. Thus, a determination is made in step 46 as to whether the subscriber desires to be notified when it fails to receive the lowest available rate. If no notification is desired, the call continues in step 48 in normal fashion known to those skilled in the art, and the subscriber is charged for the call at the determined rate (see, step 42). If notification is desired, however, an alert is given to the subscriber in step 50. In one embodiment, this alert is made by sending a tone or voice message over the voice channel from the mobile switching center to the subscriber's mobile station 30. In an alternative embodiment, a data message is sent to the mobile station 30 for viewing by the participating subscriber using the mobile station display panel.

In instances like the message display where the mobile station 30 generates the alert for subscriber perception, confirmation of the delivery of such notification is returned to the system. In the event more than one charging region per participating subscriber is supported, different notifications in step 50 are provided (i.e., different tones or messages) to alert the subscriber as to the effective charging rate for the call. Of course, other types of notification or alert, known to those skilled in the art, could be used as well.

With the alert notification in step 50, a grace time period (a delay or pause) is started to give the subscriber an opportunity to choose whether to participate in the call. If the subscriber chooses not to participate by entering an appropriate command in step 51, the call is terminated in step 53 with no calling charges being incurred. The command entered by the subscriber may alternatively effectuate a transferring of the call in step 54, or an acceptance of the call in step 55 (with the call charged in step 48 at the determined rate of step 42). If the grace period expires (step 52) without entry of a command, the default position is acceptance of the call, and the call continues in step 48 in normal fashion known to those skilled in the art with the subscriber being charged at the rate determined in step 42.

Whenever call set-up and connection is completed (see, steps 38 and 48), a record of the completion of the call is made in step 56 for billing purposes. The record comprises a traffic ticket and includes an indication of whether the participating subscriber was located inside or outside one of the charging regions included in its defined charging area, as well as an indication of whether notification was given to the subscriber of the rate. Storage of this information in the traffic ticket allows the service provider to prove to participating subscribers that all completed calls were processed and billed correctly.

There may exist instances where the participating subscriber is physically located in a cell within its charging area, but the call is handled (perhaps due to congestion, overuse, or overcrowding) through an adjacent cell not within the charging area. The participating subscriber will, accordingly, be incorrectly charged at a higher rate for the call. To correct this problem, in instances where the mobile station is ordered to perform a directed retry in an adjacent cell, the call will be charged at the lower rate applicable to the participating subscriber's charging area. This is effectuated by including within the subscriber's charging area the adjacent cells surrounding the charging area, or by testing for instances of directed retry when making the location determination. Participating subscribers should not, however, be informed that their charging area includes adjacent cells as this will likely result in subscriber misuse and a loss in revenue.

Reference is now made to FIG. 4B for a description of an enhancement to the charging service of the present invention used when a subscriber moves from one charging region to another charging region while a call is in progress (i.e., changes the location as determined in step 40). The charging rates (as determined in step 42) in such a situation might be different, and a comparison is made in step 61 of the old charging rate and new charging rate. If the new charging rate is less than the old charging rate (branch 63 from step 62), then call handling continues and the call is thereafter automatically charged in step 65 at the new charging rate. Processing of the call continues as described in FIG. 4A with the generation of a traffic ticket reflecting the change in step 56. If the old charging rate is less than the new charging rate (branch 67 from step 62), processing of the call continues as described in FIG. 4A with the subscriber being given notification if desired (steps 46 and 50), and the grace period for event selection being given (steps 51, 52, 53, 54 and 55) to determine how the call is to be handled. If the call is accepted during the notification, or if the subscriber does not desire notification, then the call is charged at the new charging rate in step 48. In instances where the participating subscriber is the calling party, it should be noted that only the options of transfer, termination or forwarding to voice mail as discussed above would be available to insure that significant additional costs would not be incurred.

Reference is now again made to FIG. 3. Information concerning subscriber charging areas 16, charging regions 18 and cells 20 is stored by the system 28 in the form of four different tables in the visitor location register maintained in each mobile switching center 34. A cell table 78 stores an identification of all cells that are included within at least one of the charging areas 16. A charging region table 80 stores an identification of all charging regions 18 that are included within at least one of the charging areas 16. A cell-to-charging region table 82 stores an identification of which cells 20 belong to which charging regions 18. Finally, a charging area-to-charging region table 84 stores an identification of which charging regions 18 belong to which charging areas 16.

With additional reference again to FIGS. 4A and 4B, the cell table 78, charging region table 80, cell-to-charging region table 82 and charging area-to-charging region table 84 are used in making the step 40 determination as to whether the subscriber is located in the subscriber's pre-defined charging area. In particular, the cell table 78, charging region table 80 and cell-to-charging region table 82 are used to determine which charging regions 18 are associated with the cell 20 handling the call. The charging area-to-charging region table 84 is then used to determine whether any of the identified charging regions 18 belong to the participating subscriber's charging area 16.

In the event the participating subscriber roams to a foreign cellular area 10, the mobile switching center 34 will request delivery of the subscriber's charging area information from the home location register 74. This information is then stored in the visitor location register 76 of the currently serving mobile switching center 34, and will be used by the mobile switching center to determine and notify the subscriber of applicable calling rates. Provision is also made for the mobile switching center 34 to convert received participating subscriber charging area information from the home area 10 of the subscriber to determine a comparable charging area 16 to be implemented for the participating subscriber in the current area 10. Thus, the charging areas feature is supported as the subscriber roams from area to area.

Figure 5:
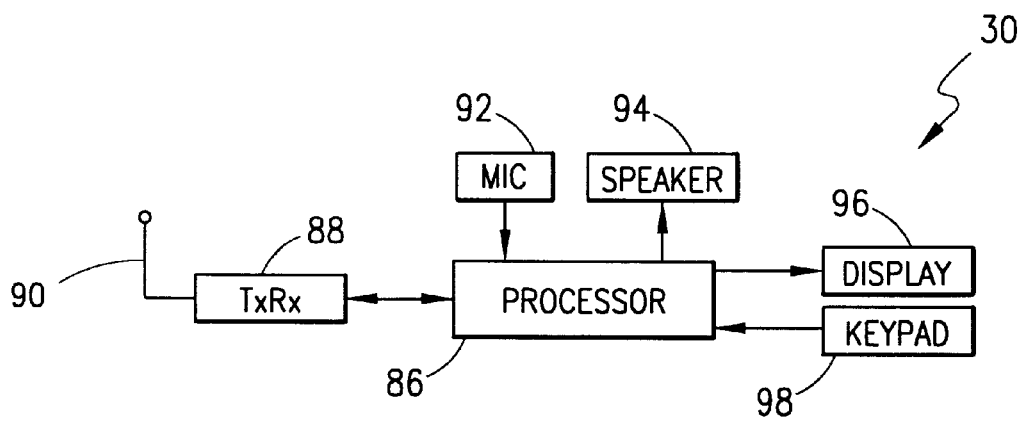
FIG. 5 is a simplified block diagram of a mobile station operable in the system of the present invention.

Referring now to FIG. 5, there is shown a simplified block diagram of the mobile station 30 including a processor 86 connected to a transceiver 88. An antenna 90 is connected to the transceiver 88 for transmitting and receiving communications over a cellular telephone network. The mobile station 30 further includes a microphone 92 and a speaker 94 connected to the processor 86 for facilitating telephonic voice communications. A display panel 96 and a keypad 98 are also included in the mobile station and connected to the processor 86.

With additional reference again to FIGS. 4A and 4B, the alert notification given in step 50 to the subscriber of the rate applied to the call comprises the transmission from the mobile switching center 34 over the voice channel to the mobile station 30 of an audio tone broadcast to the participating subscriber via the speaker 94. Alternatively, the notification of step 50 comprises the transmission from the mobile switching center of a data message with the mobile station displaying the message for participating subscriber viewing on the display panel 96. In the event wherein there is more than one charging region per charging area is supported, different audio tones or messages are broadcast from the speaker 94, or different messages displayed on display panel 96, to alert the subscriber as to the effective charging rate for the call.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular communications system having a charging rate service, comprising:

a plurality of cells;

a subscriber database defining at least one charging region having a special charging rate for subscriber cellular calls, each charging region being co-extensive with at least one of the plurality of cells;

means responsive to a cellular telephone call with a subscriber for determining which certain one of the plurality of cells is currently serving the subscriber; and means for accessing the subscriber database and for charging the special rate for said call when the determined certain cell is within the at least one charging region, and for charging a different charging rate for said call when the determined certain cell is not within the at least one charging region.

2. The cellular communications system as in claim 1 further including means for determining the location of the subscriber within the certain cell and in relation to the at least one charging region.

3. The cellular communications system as in claim 1 further including means for notifying the subscriber of the charging rate for said call.

4. The cellular communications system as in claim 3 wherein the means for notifying comprises means for sending an audible message indicative of the charging rate for the call, the audible message to be broadcast to the subscriber via a mobile station carried by said subscriber.

5. The cellular communications system as in claim 3 wherein the means for notifying comprises means for sending a data message indicative of the charging rate for the call, the data message to be displayed to the subscriber via a mobile station carried by said subscriber.

6. The cellular communications system as in claim 1 wherein the at least one of a plurality of cells being co-extensive with the at least one charging region are selected by a provider of the cellular communications system.

7. The cellular communications system as in claim 1 further including a charging area selected by the subscriber to include at least one of the charging regions and defined in the subscriber database, the means for charging further operating to charge for said call the special rate of the charging region provided the certain cell is within the charging area selected by the subscriber, and for charging the different rate for said call when the certain cell is located outside of the charging area selected by the subscriber.

8. A cellular communications system having a charging rate service, comprising:
a plurality of cells;
a subscriber database defining a plurality of charging regions each having a special charging rate for subscriber cellular calls, each charging region being co-extensive with at least one of the plurality of cells;
a charging area selected by a cellular subscriber to include at least one of the charging regions;
means responsive to a cellular telephone call with a subscriber for determining which certain one of the plurality of cells is currently serving the subscriber; and
means for accessing the subscriber database and for charging the special rate of that certain cell's charging region for said call when the determined certain cell is within the charging area selected by the subscriber, and for charging a different rate for said call when the determined certain cell is not within the charging area for the subscriber.

9. The cellular communications system as in claim 8 further including means for determining location of the subscriber within the certain cell and in relation to the charging region.

10. The cellular communications system as in claim 8 wherein the at least one of a plurality of cells being co-extensive with the charging region are selected by a provider of the cellular communications system.

11. The cellular communications system as in claim 8 further including means for notifying the subscriber of the rate for said call.

12. The cellular communications system as in claim 11 wherein the means for notifying comprises means for sending an audible message indicative of the rate for the call, the audible message to be broadcast to the subscriber via a mobile station carried by said subscriber.

13. The cellular communications system as in claim 11 wherein the means for notifying comprises means for sending a data message indicative of the rate for the call, the data message to be displayed to the subscriber via a mobile station carried by said subscriber.

14. The cellular communications system as in claim 11 wherein the means for notifying provides notice of the rate for calls during call set-up before completion of call connection or during hand-off.

15. The cellular communications system as in claim 11 wherein the means for charging further includes means for recording for each call the cell location of the subscriber as well as whether notification of the special rate was given.

16. A cellular communications charging method, comprising the steps of:
establishing a charging region, the charging region being co-extensive with at least one of a plurality of cells;
identifying in a subscriber database at least one subscriber having a preferred rate in the charging region;
determining whether the subscriber involved in a call has a preferred rate as identified in the subscriber database and determining which certain one of the plurality of cells is currently serving the subscriber;
determining whether the certain one of the cells serving the subscriber is within the established charging region; and
charging the subscriber a special rate for the call if said subscriber is identified in the subscriber database and the certain one of the cells within the established charging region, and a different rate for the call if said subscriber is not identified in the subscriber database or the certain one of the cells is not within the subscriber database within the established charging region.

17. The method as in claim 16, further including the step of notifying the subscriber of the rate based on subscriber definition in the subscriber database and subscriber location in relation to the defined charging region.

18. The method as in claim 16 wherein the step of defining the charging region includes the step of selecting a cellular service provider of each charging region.

19. The method as in claim 16 further including the step of defining a charging area for each subscriber, the charging area comprising at least one charging region, the step of charging further comprising the step of charging the subscriber the special rate of the charging region if that charging region is included in the subscriber's charging area.

20. The method as in claim 19 wherein the step of defining the charging area includes the step of selecting by the subscriber of the charging region or regions to be included in the subscriber's charging area.

21. A cellular communications charging method, comprising the steps of:
establishing by a cellular service provider of a plurality of charging regions across a cellular service area, each charging region being co-extensive with at least one of a plurality of cells;
selecting by a subscriber of at least one of the established charging regions along with the cells therein to be included in a charging area for that subscriber;
keeping the charging area for that subscriber in a subscriber database;
for each call, determining which certain one of the plurality of cells is currently serving the subscriber telephone call;
determining whether that subscriber has selected a charging area and whether the certain one of the plurality of cells serving the subscriber is within the selected charging area; and
charging the participating subscriber a special charging region rate for the call if the subscriber has selected a charging area and the certain cell is within its selected charging area, the special rate being the rate for the determined charging region within which the subscriber is located, and charging a different rate for the call if the subscriber has not selected a charging area or has selected a charging area and the certain one of the cells is not within its selected charging area.

22. The method as in claim 21, further including the step of notifying the subscriber of the rate to be charged for the call.

23. The method as in claim 22 further including the step of waiting for the expiration of a grace period following notification to give the subscriber an opportunity to handle the call in a manner other than to engage in a communication.

24. A cellular communications system, comprising:
- a plurality of mobile stations, each mobile station assigned to a subscriber having selected a charging area being co-extensive with certain cells within a plurality of cells; and
- a mobile switching center connected to each base station and including:
  - means for storing a record of the each subscriber's selected charging area;
  - means for determining for each call whether the certain cell serving the subscriber is within its selected charging area; and
  - means responsive to the means for determining for charging the certain subscriber a special rate for calls when the certain cell is within the selected charging area for that certain subscriber and a different rate for calls when the certain cell is not within the selected charging area for that certain subscriber.

25. The cellular communications system as in claim 24 wherein the mobile switching center further includes means for notifying the certain subscriber of the rate to be applied to the call.

26. The cellular communications system as in claim 24 wherein the mobile switching center further includes means for processing a received foreign charging are to define a charging area for visiting subscriber use.

27. The cellular communications system as in claim 24 wherein the subscriber selected charging area comprises subscriber selected ones of a plurality of cellular service provider selected charging regions, each charging region having its own special rate, the means for charging applying the special rate of the charging region within which the subscriber is located provided that charging region is located within the subscriber's selected charging area.

* * * * *